(12) United States Patent
Molaro et al.

(10) Patent No.: US 8,868,677 B2
(45) Date of Patent: Oct. 21, 2014

(54) AUTOMATED DATA MIGRATION ACROSS A PLURALITY OF DEVICES

(75) Inventors: Donald Joseph Molaro, Cupertino, CA (US); Timothy George Harrington, II, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 373 days.

(21) Appl. No.: 13/448,192

(22) Filed: Apr. 16, 2012

(65) Prior Publication Data

US 2013/0275548 A1    Oct. 17, 2013

(51) Int. Cl.
*G06F 15/167* (2006.01)

(52) U.S. Cl.
USPC ........................................................ 709/214

(58) Field of Classification Search
CPC .................... G06F 17/30575–17/30584; G06F 17/30619–17/30631
USPC ............................ 709/212–219; 707/609–625
See application file for complete search history.

(56) References Cited

U.S. PATENT DOCUMENTS

| | | | |
|---|---|---|---|
| 7,121,469 B2 | 10/2006 | Dorai et al. | |
| 7,681,112 B1 | 3/2010 | Francis | |
| 7,860,309 B1 | 12/2010 | Bodnar et al. | |
| 7,962,449 B2* | 6/2011 | Giampaolo et al. | 707/611 |
| 8,001,088 B2* | 8/2011 | Tawa, Jr. | 707/673 |
| 2004/0199507 A1* | 10/2004 | Tawa, Jr. | 707/7 |
| 2004/0267810 A1* | 12/2004 | Kidd et al. | 707/104.1 |
| 2006/0206533 A1 | 9/2006 | MacLaurin et al. | |
| 2007/0079321 A1 | 4/2007 | Ott, IV | |
| 2009/0094247 A1 | 4/2009 | Fredlund et al. | |
| 2010/0005151 A1* | 1/2010 | Gokhale | 709/216 |
| 2010/0235466 A1 | 9/2010 | Jung et al. | |
| 2010/0257239 A1 | 10/2010 | Roberts | |
| 2010/0332454 A1* | 12/2010 | Prahlad et al. | 707/654 |
| 2011/0175923 A1 | 7/2011 | Mahajan et al. | |
| 2011/0219097 A1 | 9/2011 | Crockett | |

* cited by examiner

*Primary Examiner* — Brendan Higa
(74) *Attorney, Agent, or Firm* — Brokaw Patent Law PC; Christopher J. Brokaw

(57) ABSTRACT

Approaches for a digital storage device that moves or transforms data between various storage locations based on anticipated use. A digital storage device comprises one or more processors and one or more storage mediums for storing digital data. The digital storage device comprises a software agent. The agent maintains a local index to a set of data sets stored on the storage mediums. The indexed files are associated with an identifier, which may identity any unique entity. The software agent sends the local index over a network to an index manager. The agent receives, from the index manager, a remote index that identifies storage locations for other data sets associated with the identifier. The agent may use the local and remote index to move data sets between storage locations and/or transform data sets based on which device they will be accessed.

19 Claims, 3 Drawing Sheets

AUTOMATED DATA MIGRATION ACROSS A PLURALITY OF DEVICES

FIELD OF THE INVENTION

Embodiments of the invention relate to managing digital data stored across a plurality of locations based on the anticipated use of the digital data.

BACKGROUND OF THE INVENTION

Portable devices that store and use digital data, such as cell phones, tablet PCs, laptops, PCs, and the like, have become ubiquitous. Moreover, the use of such devices is expected to increase over time. As a result, it has become commonplace for people to create, access, and store digital data in a variety of different locations. Often, there may be one or more copies of data. Over time, different copies of the same data may be stored in many locations. The different copies of data may be duplicated on the same device or be stored in a number of devices or on-line services. Thus, it may be difficult to locate the specific data that is of interest.

Many different devices can be used to produce, consume, and store digital data. Given the importance of digital data in today's society, it is desirable to allow for access to digital data without regard to its physical location.

SUMMARY OF THE INVENTION

Embodiments of the invention are directed towards digital storage devices and services capable of informing the user of where, from among a plurality of locations, his or her digital content is stored. The digital storage device or service may also move and/or transform data between various storage locations based on anticipated use.

In an embodiment, a digital storage device or service comprises or employs one or more processors and optionally one or more persistent storage devices such as a magnetic hard-disk drive or a solid state device. The digital storage device or service comprises or employs a software agent. The storage device or service maintains or employs a local index to a set of files stored on the storage device or service.

The indexed files may be associated with an entity identified by identification information. Identification information may identify any entity, such as particular user, a group of users, or the public at large. The device or service is provided authentication and identification information, such as a user-name and password. Authentication and identification information may also come from a single sign-on service or other authentication mechanism that is outside the scope of the invention.

The storage device or service provides the locally generated index ("the local index") over a network to an index manager. The storage device or service receives, from the index manager, a remote index that identifies storage locations for other sets of data associated with the identification information. The storage device or service may then use the local and remote index to move and/or transform the files between storage locations.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for managing digital data stored across a plurality of locations based on anticipated use of the digital data are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Embodiments of the invention are directed towards a digital storage device or service capable of locating, from among a plurality of locations, digital data. In this way, regardless of where the data is stored, data may be accessed at the time of need. The digital storage device or service in certain embodiments may also move and/or transform data between various storage locations based on anticipated use. Advantageously, these embodiments allow data to be displayed, presented, or accessed in an optimal manner. For example, a video file may be moved to and optimized for display on the device on which it will be played.

Figure 1:
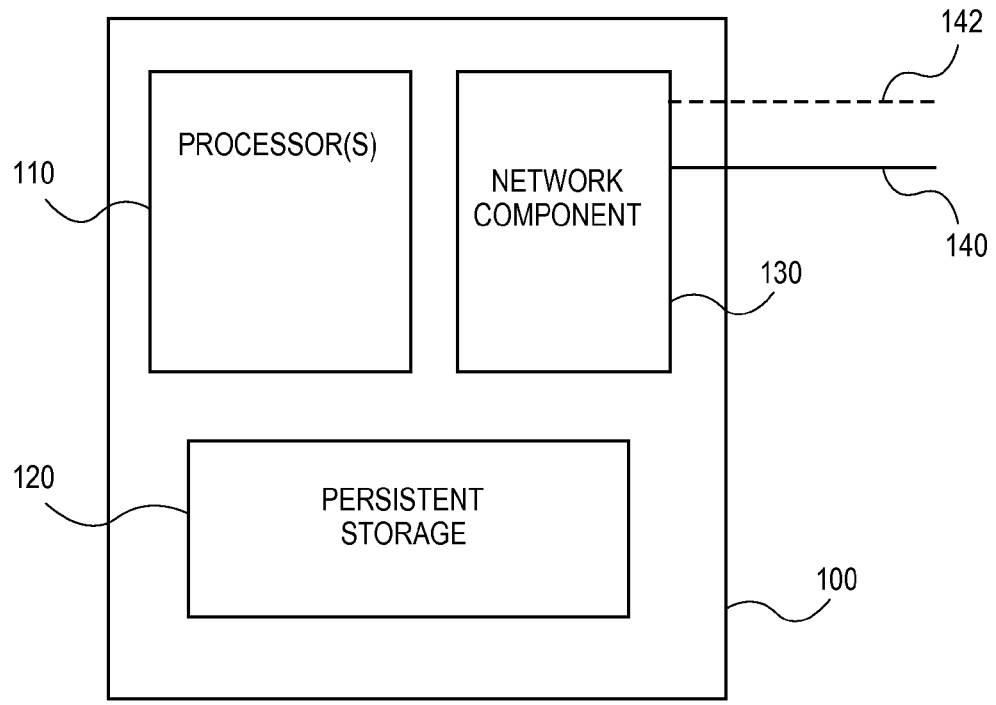
FIG. 1 is a block diagram of a digital storage device according to an embodiment of the invention.

FIG. 1 is a block diagram of a digital storage device 100 according to an embodiment of the invention. Storage device 100 may include one or more processors 110, a persistent storage 120, and a network component. A commercial, non-limiting example of storage device 100 is a device in the G-Connect family of products from Hitachi Global Storage Technologies of San Jose, Calif.

Persistent storage 120 broadly refers to any persistent storage medium for storing digital data. Persistent storage 120 may be implemented using a hard-disk or a solid-state device.

Network component 130 broadly refers to any component capable of enabling storage device 100 to communicate over a network. Network component 130 may enable storage device 100 to communicate over a physical network connection 140 and/or a wireless network connection 142. In an embodiment, network component 130 may also enable storage device 100 to act as a Wi-Fi hotspot for other wireless devices.

Managing Digital Data Stored Across a Plurality of Locations

Figure 2:
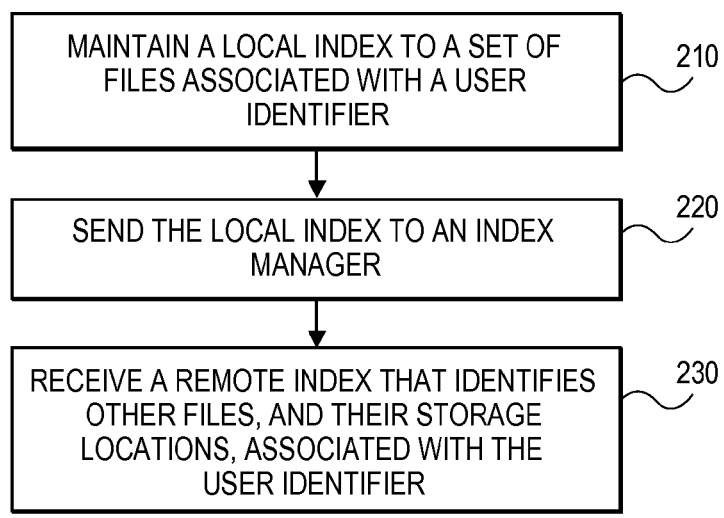
FIG. 2 is a flowchart of the steps performed in managing digital data stored across a plurality of locations according to an embodiment of the invention.
Figure 3:
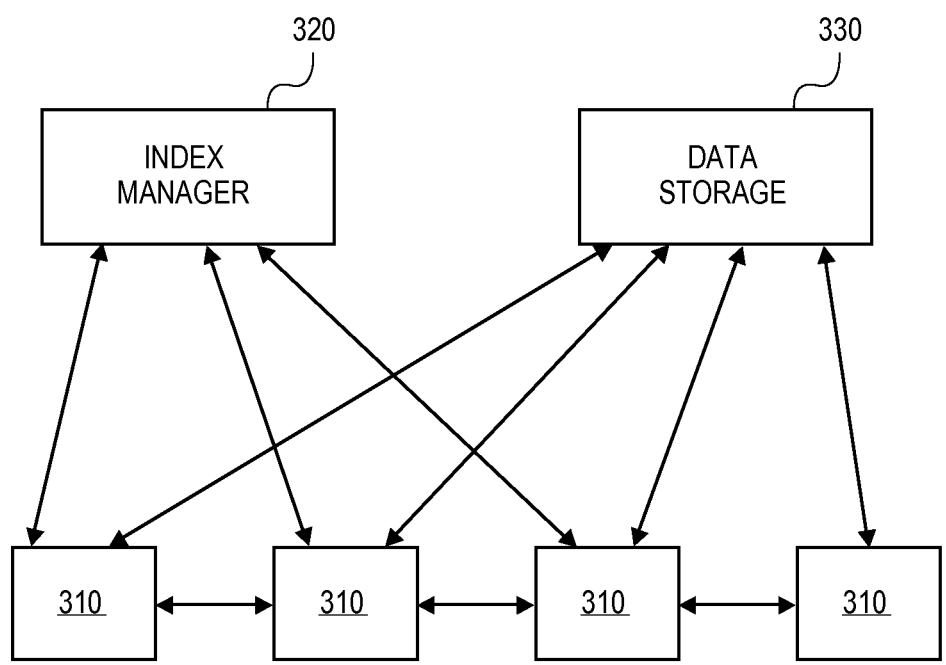
FIG. 3 is a block diagram of a system according to an embodiment of the invention.

FIG. 2 is a flowchart of the steps performed in managing digital data stored across a plurality of locations according to an embodiment of the invention. The steps of FIG. 2 shall be explained below with reference to FIG. 3, which is a block diagram of a system 300 according to an embodiment of the invention. FIG. 3 depicts devices 310, 312, 314, and 316, which each represent any device or service which is capable of storing digital data and communicating with other devices over a network. For example, devices 310, 312, 314, and 316 may each correspond to storage device 100 of FIG. 1, a PC, a laptop, a tablet computer, a cell phone, a personal digital assistant (PDA), and the like. Note that while only four devices are depicted in FIG. 3 for clarity, system 300 may include any number of devices or services.

In step 210, a locally generated index (a "local index") to data, such as a set of files, associated with unique identification information is maintained on a device. Each device or service in system 300 may perform step 210. For purposes of providing a clear example, the steps of FIG. 2 will be explained herein as being performed by device or service 310. Device or service 310 may perform step 210 by maintaining an index (referred to herein as a local index) to data stored on device 310 that is associated with unique identification information.

Authentication and identification information is used to define the access to index information and data. In an embodiment there may be index information and data that is only available with authenticated access. There are numerous methods for determining authentication and identification for access to a device or service such as device or service 310, which are outside the scope of this invention but should be known to those skilled in the art. Therefore, in an embodiment, if valid authentication and identification information is not presented to device or service 310, then access may be denied to some or all of the data stored on device or service 310.

There are a variety of different ways in which the local index may be implemented. Those skilled in the art may choose to implement the local index using a variety of different mechanisms, so long as the mechanism allows the local index to perform the functions described herein.

The local index may identify a wide array of information about data stored on device or service 310. In an embodiment, the local index may identify when each datum indexed by the local index was created. In another embodiment, the local index may identify when each datum indexed by the local index was accessed. In yet another embodiment, the local index may identify, for each datum indexed by the local index, one or more tags or other meta-data assigned by the user or the mechanism used to create the data. Meta-data is information about the data that describes attributes of the data but is not necessarily part of the data itself. In another embodiment, the local index may also identify or extract, for each datum, meta-data about the content of the datum. By way of example, such extracted meta-data for a file may include whether a digital picture is a color or black and white picture or the quality or resolution of a digital video file. Those skilled in the art will appreciate that various attributes of a datum may be identified and/or extracted by the local index.

As another example, the local index may identify when files were accessed at a particular storage locations and/or may identify what operations were performed against a files at a particular storage location.

In step 220, device or service 310 sends over a network index data that describes the local index on device 310 to an index manager, such as index manager 320 depicted in FIG. 3. Index manager 320 is intended to broadly represent a functional component which is capable of performing the functions attributed to it herein. Index manager 320 may receive or retrieve index data from devices or services that describes the local indexes on those devices or services.

Index manager 320 may be, but need not be, implemented by the same entity as on-line data storage service 330. On-line data storage service 330, also depicted in FIG. 3, is intended to broadly represent any type of cloud-based data storage service. Data storage service 330 may be implemented by one or more servers which are accessible over a network and capable of storing data. A non-limiting commercial example of data storage service 330 is Hitachi Backup, available from Hitachi Global Storage Technologies of San Jose, Calif.

In an embodiment where index manager 320 is implemented by an entity which also implements data storage service 330, device 310 may perform step 220 by storing its local index on data storage service 330. Note that data storage service 330 is optional, as embodiments of the invention need not include data storage service 330.

Embodiments may perform step 220 in a variety of different ways. For example, device or service 310 may send index data that describes the characteristics of its local index to index manager 320. Alternately, device or service 310 may serialize its local index and send the serialized form of its local index to index manager 320.

After index manager 320 receives or retrieves information about the local indexes on each storage device in system 300, in step 230, index manager 320 sends, over a network, a remote index to each device in system 300, including device 310. The remote index identifies other data, and their storage locations, associated with the same identification information as the local file. For example, in step 230, device 310 may receive from index manager 320 a remote index that identifies all data stored on devices 312, 314, and 316.

The remote index may also identify the same type of additional information about data as described above with reference to local indexes. Thus, possession of both the local index and the remote index enables a device in system 300 to identify how many versions of the same file exist in system 300, where each version of the same file is stored in system 300, and the meta-data describing each version of the same file in system 300.

Once each device or service in system 300 possesses both a local index and a remote index, the device or service will be informed of the location of each datum, such as a file, stored on a device or service in system 300 associated with the identification information. In this way, anytime an authenticated and identified connection is successfully create to a device or service in system 300, the connected entity may be informed of the location of where individual instances of data associated with the authentication information is stored. In addition, if more than one copy of a datum is stored in system 300, the connected entity may be informed of where each instance of the datum is stored. In this way, multiple instances of a datum may be identified and their storage location determined.

Various embodiments may employ system 300 to support a wide array of functionality to assist in the management of digital content. Many such approaches will be described in greater detail below.

Locating Data Stored Across Different Locations

Using embodiments of the invention, if a tablet PC or a cell phone communicates over a network to a device or service of system 300 and successfully authenticates and provides identification information, then the tablet PC or cell phone may discover the location of each datum associated with the identification information. After discovering the location of a particular datum, such as a file, in system 300, the tablet PC or cell phone may retrieve the datum over the network.

To illustrate, if device or service 310 receives input, from a tablet PC, that selects a set of data (which may be physically on device 310, on a different device or service than device or service 310, or a combination of both), device or service 310 may send, over a network, datum location data that identifies the location of where each selected datum is located in system 300. Device or service 310 may determine the location of each datum in system 300 using the local index and the remote index. Alternately, whenever a device or service in system 300 provides information about a datum, such as file, to a requestor (for example, in response to a search for data matching a certain criteria), the device or service of system 300 may, without an express request, provide information to the requestor about the location of where each datum is stored in system 300.

Note that in certain situations, the remote index on a device in system 300 may indicate that a particular datum is stored on data storage service 330. If a copy of a datum of interest is stored on a device or service that is not currently accessible, then it may be possible to retrieve the copy of the datum from data storage service 330 if the datum is stored thereon. For example, assume that a file of interest is stored on device 314, but device is currently powered down or not accessible via a wired or wireless network. If such a case, if the file is also stored on data storage service 330, then the file may still be retrieved using a cell phone or tablet PC, for example, if the tablet PC or cell phone can access data storage service 330.

Moving Data from One Location to Another Based on Anticipated Use

Embodiments enable data to be moved or copied to various locations in system 300, without either informing a connected entity, such as a user, or receiving a request from a connected entity to do so, based on the anticipated use of the data. Embodiments may move or copy data from one location in system 300 to another in a manner that is transparent to the connected entity. In this way, if embodiments deem it advantageous, portions of data managed by embodiment may be moved or copied to a location where the data is anticipated to be accessed without the user's knowledge or instruction. If embodiments deem it advantageous, a copy of data may be stored on data storage service 330 so that even if the original location of the data becomes inaccessible, the data may still be accessed by any device or service which can access data storage service 330 over a network.

To illustrate another illustrate use case of an embodiment, assume that a user copied two episodes of a television series to device or service 310. At some later point in time, embodiments of the invention may determine that it would be advantageous to copy three more episodes of the television show from device or service 316 to device or service 310 if space is available on device or service 310 and/or bandwidth is available to do so. However, if the user does not watch the two episodes on device or service 310, then embodiments may determine that it is not necessary to copy any more episodes of the television show from device or service 316 to device or service 310.

Embodiments of the invention may employ software executing on devices or services 310, 312, 314, and 316 that determines whether data should be copied or moved from one device or service to another based on the anticipated use of the data. Such software (termed an "agent" in an embodiment) may employ a variety of different factors in making such a determination. Indeed, based on the algorithm used by the embodiment, data may be moved or copied from one location in system 300 to another location.

To illustrate some of the factors that embodiments may consider when determining whether to move or copy a datum, an embodiment may determine whether to move or copy a datum to a location in system 300 based, at least in part, on where the connected entity is anticipated to access the datum. Alternately or additionally, an embodiment may determine whether to move or copy a datum to a location in system 300 based, at least in part, on whether there is available space to store the datum at the new location or whether there is sufficient bandwidth to transfer to the datum over the network to the new location.

The number of factors considered by algorithms used by embodiments in determining whether to move or copy a datum to a new location in system 300 may vary and may be arbitrarily complex. Thus, embodiments may consider any number of factors in making such a determination and may consider additional factors than those expressly discussed above.

Transforming Data from One Form to Another Based on Anticipated Use

Embodiments of the invention may transform a datum based on its anticipated use. To illustrate, embodiments of the invention may create a copy of a digital video file with a reduced resolution if it is determined the display of the device would not sufficiently support the original resolution of the digital video file. In this way, a high definition video file may be automatically and transparently downgraded in quality to run more smoothly on a mobile phone or other such device with a limited display capability. As another example, embodiments of the invention may automatically store a lower quality version of a video file or digital image on backup server 330 in a manner transparent to a user.

In an embodiment, if an agent executing on device or service 310 determines that an operation should be performed against a current version of one or more datums stored on a device or service, then the agent may perform the operation against the one or more datums to create a new version of each of the one or more datums. The operation may be performed against the one or more datums by the agent without receiving an instruction from the connected entity to do so; therefore the operation performed on the one or more datums may be performed transparently to the connected entity.

To illustrate how such an embodiment may be employed, the operation may be an operation to adjust the quality or resolution of the one or more files based upon the display capabilities of device 310. In this way, high definition video may be automatically downgraded in quality so that it can be appropriately displayed on a mobile phone or other such device with limited display capabilities.

As another example, the user may perform an operation to one datum, and the agent may determine that the connected entity may wish the same type of operation to be performed against similar datums. Datums may be deemed similar to each other if their associated meta-data is determined to have the same characteristic or be substantially similar in one or more respects. For example, if a user processes an image file to reduce the red eye shown in a photograph, then the agent may determine that the user may also wish the same operation to be performed against all photographs taken on the same date. In this embodiment, after identifying the operation the user requested to be performed against one digital photograph, the agent may identify other similar photographs (such as those taken on the same day or having other similar characteristics).

Thereafter, without instruction from the user, the agent may perform the same operation against the one or more similar files to create a new version of the one or more similar files. Then, the new version of the files may be displaying (if the files are not graphic files, the user may be notified of the new version of the files) to solicit instruction from the user about whether the new version of the one or more files should be saved or discarded. If the user approves of the new version of the files, then the new version of the files may be saved or may replace the prior version of the files. On the other hand, if the user does not approve of the new version of the files, the new version of the files may be discarded so that only the original version of the files remains.

Note that prior to copying or moving a datum from one location to another in system 300, the datum may be transformed to reflect the specific capabilities of the device at the datum's new location. For example, when copying one or more files from device or service 310 to device or service 312, in an embodiment, without instruction for a user, an operation is performed against the one or more files to adjust the quality or resolution of the one or more files based upon the capabilities of device or service 312 prior to sending the one or more files to device or service 312.

Secure Storage of Data

In an embodiment, when an agent executing on a device or service in system 300, such as device or service 310, receives an instruction from a connected entity to securely store a datum, the agent may duplicate the datum into two or more portions. The agent may then cause each of the two or more portions to be stored on a different device or service in system 300, e.g., portions of the single file may be stored on device or service 310, device or service 312, and device or service 314. In this way, the failure or loss of a single device or service in system 300 would not enable a malicious party access to the complete data set. Even if any one of the devices or services in system 300 is stolen or compromised, the data portions may not be accessible, as the may portions, without being assembled may not be in a recognizable format and will be incomplete and not interpretable using standard applications.

After the agent causes portions of a datum to be stored at a different physical location in system 300, the agent updates the local index and the remote index to identify where each of the portions are stored. Afterward, the agent may inform index manager 320 that (a) the datum in question has been decomposed into multiple portions and (b) the locations where each of the multiple portions are stored in system 300. After being so informed, index manager 320 may inform other devices or services in system 300 by providing them a revised remote index that contains the location of the datum portions. To access the entire datum, it will be necessary to obtain a copy of each datum portion and reassembly the portions into a complete datum.

Hardware Mechanisms

Figure 4:
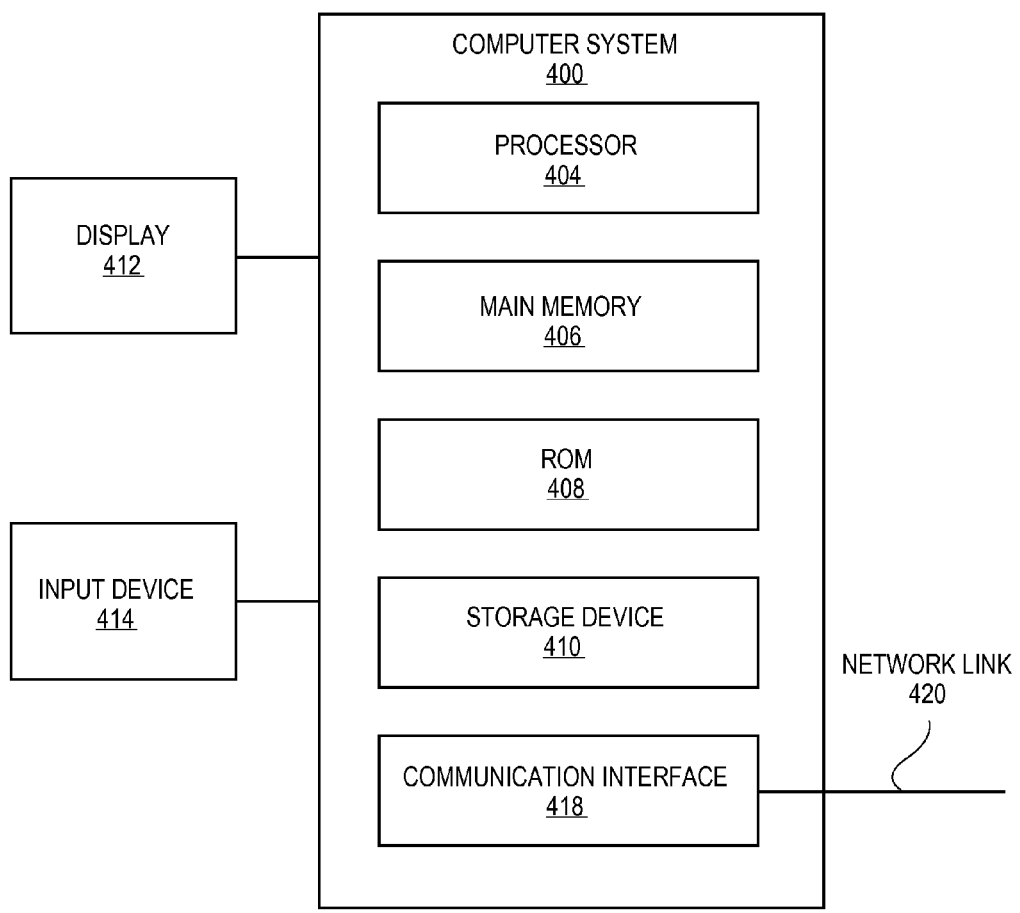
FIG. 4 is a block diagram that illustrates a computer system upon which an embodiment of the invention may be implemented.

In an embodiment, storage device 100 of FIG. 1 may be implemented on, include, or correspond to a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A digital storage device, comprising:
one or more processors;
one or more persistent storage mediums storing one or more sequences of instructions, which when executed by the one or more processors, cause
maintaining a local index to a plurality of data sets stored on the one or more persistent storage mediums, wherein the plurality of data sets are associated with a particular identifier, and wherein the particular identifier is supplied by an entity when logging onto the digital storage device;
sending the local index over a network to an index manager; and
receiving, from the index manager over the network, a remote index that identifies storage locations for one or more other data sets associated with the particular identifier.

2. The digital storage device of claim 1, wherein the execution of the one or more sequences of instructions further causes:
in response to receiving input that selects a subset of said plurality of data sets and said one or more other data sets, sending, over the network, location data that identifies the storage location of said subset, wherein the location data is determined using the local index and the remote index.

3. The digital storage device of claim 1, wherein said local index and said remote index each identify when data was accessed at each of the different storage locations and what operations were performed against the data at the different storage locations.

4. The digital storage device of claim 1, wherein said local index and said remote index each identify how many versions of the same data set exist, where each version of the same data set is stored, and the resolution or quality of each version of the same data set.

5. The digital storage device of claim 1, wherein the execution of the one or more sequences of instructions further causes:
determining that one or more particular data sets stored on the digital storage device should be copied to a different device; and
copying the one or more particular data sets from the digital storage device to the different device,
wherein copying the one or more particular data sets is not performed in response to receiving an instruction to copy the one or more particular data sets from the entity, and wherein copying the one or more particular data sets is performed transparently to the entity.

6. The digital storage device of claim 5, wherein determining that the one or more particular data sets should be copied is based, at least in part, on whether the entity is anticipated to access the one or more particular data sets on the different device.

7. The digital storage device of claim 5, wherein determining that the one or more particular data sets should be copied is based, at least in part, on whether there is available space on the different device to store the one or more particular data sets.

8. The digital storage device of claim 5, wherein determining that the one or more particular data sets should be copied is based, at least in part, on whether there is sufficient bandwidth to transfer to one or more particular data sets over the network to the different device.

9. The digital storage device of claim 5, wherein copying the one or more particular data sets from the digital storage device to the different device further comprises:
performing, without instruction from the entity, an operation against the one or more particular data sets to adjust the quality or resolution of the one or more particular data sets based upon the capabilities of the different device; and
sending, without instruction from the entity, the one or more particular data sets to the different device.

10. The digital storage device of claim 1, wherein the execution of the one or more sequences of instructions further causes:
determining that an operation should be performed against a current version of one or more particular data sets stored on the digital storage device; and
performing the operation against the one or more particular data sets to create a new version of each of the one or more particular data sets,
wherein performing the operation against the one or more particular data sets is not performed in response to receiving an instruction to perform the operation against the one or more particular data sets, and wherein performing the operation is performed transparently to the entity.

11. The digital storage device of claim 10, wherein the operation is to adjust the quality or resolution of the one or more particular data sets is based upon the capabilities of the digital storage device.

12. The digital storage device of claim 10, wherein performing the operation against the one or more particular data sets to create the new version of each of the one or more particular data sets comprises:

receiving an instruction to perform the operation against one data set;

determining that the one or more particular data sets are similar to the one data set;

performing, without instruction from the entity, the operation against the one or more particular data sets to create the new version of the one or more particular data sets; and after performing the operation against the one or more particular data sets, displaying or providing access to the one or more particular data sets to solicit instruction from the entity about whether the new version of the one or more particular data sets should be saved or discarded.

13. The digital storage device of claim 1, wherein execution of the one or more sequences of instructions further causes:

in response to receiving instruction that instructs the digital storage device to securely store a data set, the digital storage device decomposing a data set into two or more portions;

the digital storage device storing at least one portion of the two or more portions on a different physical device;

the digital storage device updating the local index and the remote index to identify where each of the two or more portions is stored; and the digital storage device informing the index manager (a) the data set has been decomposed into two or more portions and (b) the locations where each of the two or more portions are stored.

14. A digital storage device, comprising:

one or more processors;

one or more persistent storage mediums storing one or more sequences of instructions, which when executed by the one or more processors, causes:

maintaining a local index to a plurality of data sets stored on the one or more persistent storage mediums, wherein the plurality of data sets are associated with a particular identifier, and wherein the particular identifier is supplied by an entity when logging onto the digital storage device;

sending the local index over a network to an index manager;

receiving, from the index manager over the network, a remote index that identifies storage locations for one or more other data sets associated with the particular identifier;

determining that one or more particular data sets stored on the digital storage device should be copied to a different device; and copying the one or more particular data sets from the digital storage device to the different device, wherein copying the one or more particular datat sets is not performed in response to receiving an instruction to copy the one or more particular data sets from the entity, and wherein copying the one or more particular data sets is performed transparently to the entity.

15. The digital storage device of claim 14, wherein determining that the one or more particular data sets should be copied is based, at least in part, on whether the entity is anticipated to access the one or more particular data sets on the different device.

16. The digital storage device of claim 14, wherein determining that the one or more particular data sets should be copied is based, at least in part, on whether there is available space on the different device to store the one or more particular data sets.

17. The digital storage device of claim 14, wherein determining that the one or more particular data sets should be copied is based, at least in part, on whether there is sufficient bandwidth to transfer to one or more particular data sets over the network to the different device.

18. A digital storage device, comprising:

one or more processors;

one or more persistent storage mediums storing one or more sequences of instructions, which when executed by the one or more processors, causes:

maintaining a local index to a set of data sets stored on the one or more persistent storage mediums, wherein the set of data sets are associated with a particular identifier, and wherein the particular identifier is supplied by an entity when logging onto the digital storage device;

sending the local index over a network to an index manager;

receiving, from the index manager over the network, a remote index that identifies storage locations for one or more other data sets associated with the particular identifier;

determining that an operation should be performed against a current version of each of the one or more data sets stored on the digital storage device; and performing the operation against the one or more data sets to create a new version of each of the one or more data sets, wherein performing the operation against the one or more data sets is not performed in response to receiving an instruction to perform the operation against the one or more data sets, and wherein performing the operation is performed transparently to the entity.

19. The digital storage device of claim 18, wherein the operation is to adjust the quality or resolution of the one or more data sets based upon the capabilities of the digital storage device.

* * * * *